United States Patent
Jaeger et al.

(10) Patent No.: US 6,862,734 B1
(45) Date of Patent: Mar. 1, 2005

(54) MECHANISM FOR SYNCHRONOUS INTERPROCESS COMMUNICATION OVER TRANSPARENT EXTERNAL MONITORS

(75) Inventors: Trent Ray Jaeger, Croton-on-Hudson, NY (US); Jonathon Earnshaw Tidswell, Macquarie Centre (AU)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 09/661,341

(22) Filed: Sep. 14, 2000

(51) Int. Cl.[7] .............................. G06F 3/00; G06F 9/44; G06F 9/46; G06F 13/00
(52) U.S. Cl. ........................................ 719/313; 719/310
(58) Field of Search ........................ 719/310, 311–316; 709/102–108, 205; 718/102–108

(56) References Cited

U.S. PATENT DOCUMENTS 6,330,677 B1 * 12/2001 Madoukh .................... 713/200

OTHER PUBLICATIONS

Au et al, L4 User Manual Version 1.14, The University of New South Wales, Mar. 15, 1999, pp. 1–53.*
Jaeger et al, Security Architecture for Component–based Operating Systems, System Architecture Group,Sep. 1998.*
Jaeger et al, Operating System Protection for Fine–Grained Programs, USENIX, Jan. 26–29, 1998.*
Jaeger et al, Synchronous IPC over Transparent Monitors, IBM Research Center, Sep. 2000.*

* cited by examiner

*Primary Examiner*—Thomas Lee
*Assistant Examiner*—Diem Cao
(74) *Attorney, Agent, or Firm*—Scully, Scott, Murphy & Presser; Douglas W. Cameron

(57) ABSTRACT

A method and system for performing interprocess communications (IPCs). The method comprises the steps of receiving IPC requests, where each of the IPC requests identifies a source and a destination; building IPCs in response to the request: transmitting the IPCs from the sources to the destinations; and intercepting and examining selected ones of the IPCs. The method comprises the further step of controlling the synchrony of the IPCs so that each IPC appears to its source and destination to be implemented according to the same semantics regardless of whether the IPC is intercepted and examined. With the preferred embodiment of this invention, the system monitors are considered as an extension of the system kernel (although they may be linked into the kernel and run in kernel mode as well), so the source and destination are treated as if the kernel is still processing the IPC. Thus, the desired. semantics of communication can be implemented in the monitors.

35 Claims, 15 Drawing Sheets

Synchronous IPC Over Monitors

Synchronous IPC Over Monitors

MECHANISM FOR SYNCHRONOUS INTERPROCESS COMMUNICATION OVER TRANSPARENT EXTERNAL MONITORS

BACKGROUND OF THE INVENTION

1. Field of Invention

The present invention relates generally to the field of interprocess communication. More particularly, this invention relates to an interprocess communication mechanism that enables the synchrony semantics of each communication to be controlled by external entities called monitors, such that: (1) communication may be redirected to such external entities transparently to the sender and receiver of the communication and (2) the monitors can determine the semantics of a completed communication as they desire.

2. Background of the Invention

Interprocess communication (IPC) monitoring enables the examination of any IPC between a source and a destination. IPC monitoring is useful for a variety of purposes, including debugging, logging, and security. For example, a monitor may collect communication state for the purpose of debugging a program consisting of several independent tasks. Also, a monitor can be used to filter communication data or control the communication rate for security purposes.

Transparent monitoring means that the source and destination are not aware that they are being monitored.

This has two advantages: (1) the system can control the insertion and removal of monitors without interacting with either the source or destination, and (2) the source and destination protocols do not need to take into account the possibility that they may be monitored. Traditional systems make no attempt to support transparent monitoring. Using Mach-style ports (see K. Loepere, Mach 3 Kernel Principles, Open Software Foundation and Carnegie Mellon University, 1992), the source and destination hold rights that must be revoked in order to insert a monitor, so at least one must be notified before such a change can occur safely. The Pebble microkernel enables transparent redirection of source IPCs using its portals to implement customized IPC, but the redirection is not transparent to the destination because it sees that the message is from the redirected task, not the original (see E. Gabber et al, Building Efficient Operating Systems from User-level Components in Pebble, in Proceedings of the 1999 USENIX Annual Technical conference, 1999).

Other IPC mechanisms, such as Clans & Chiefs (see J. Liedtke, Clans & Chiefs, in Architektur von Rechensystemen, 1992, in English) and IPC Redirection (see, "Flexible Access Control Using IPC Redirection," HotOS 1999), enable monitors to intercept and forward IPCs while claiming to be the original source of the IPC. Thus, the destination receives the IPC from the source, not the monitor, so it need not know that an IPC is being monitored. Unfortunately, such mechanisms are not truly transparent because the kernel's IPC semantics are not preserved when a monitor intercepts an IPC. Modern microkernels implement a synchronous IPC semantics, which means that the source is blocked until the destination is ready to receive the IPC or an error occurs (e.g., the destination task is killed or a timeout expires). When destination commences receipt, the IPC is sent to the destination and the source unblocks. Unfortunately, if a monitor is inserted on an IPC path, the source is unblocked when the IPC is received by the monitor, not the destination. This may result in some anomalous behaviors, such as: (1) the source assuming that IPCs have been delivered to the destination before they really have; (2) the source terminating IPCs due to timeout expiration even though the destination is ready, but because the monitor was not ready; and (3) the source assuming that the IPC was delivered reliably to the destination when an error may have occurred.

What is needed is that the system (i.e., the kernel and the monitors) control the synchrony of each communication, so that the communication appears to the sender and destination to be implemented according to the same semantics regardless of whether a monitor is present or not. Further, the system may choose arbitrary actions upon a communication, so the interprocess communication mechanism must permit the system to provide any desired semantics. Lastly, the interprocess communication mechanism must result in a system that is robust in the presence of errors.

SUMMARY OF THE INVENTION

An object of this invention is to improve interprocess communications.

Another object of the present invention is to provide a method and system for controlling the synchrony of interprocess communications so that the communications appear to the senders and destinations to be implemented according to the same semantics regardless of whether the communications are monitored or not.

A further object of this invention is to use monitors, for monitoring interprocess communications, as extensions of a system kernel, to that, when a particular communication is monitored, the source and destination of the communication are treated as if the kernel is still processing the communication.

These and other objects are attained with a method and system for performing interprocess communications (IPCs). The method comprises the steps of receiving IPC requests, where each of the IPC requests identifies a source and a destination; building IPCs in response to the request; transmitting the IPCs from the sources to the destinations; and intercepting and examining selected ones of the IPCs. The method comprises the further step of controlling the synchrony of the IPCs so that each IPC appears to its source and destination to be implemented according to the same semantics regardless of whether the IPC is intercepted and examined.

With the preferred embodiment of this invention, the system monitors are considered as an extension of the system kernel (although they may be linked into the kernel and run in kernel mode as well), so the source and destination are treated as if the kernel is still processing the IPC. Thus, the desired semantics of communication can be implemented in the monitors. However, there are a number of possible monitoring semantics that may be reasonable, so in order to maintain utility of the approach, the IPC mechanism enables the monitors to coordinate using a small set of actions.

These actions are as follows. First, the interception of an IPC by a monitor permits the monitor to manage: (1) the identity of the source that ultimately must be unblocked; (2) when the sender is unblocked; and (3) whether the monitor is notified when the communication reaches the destination. In addition, error handling semantics can be expressed by the monitors such that all communication state in the monitors is maintained consistently.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENT

For the preferred embodiment, the L4 microkernel's IPC mechanism as the base IPC mechanism. The L4 IPC mechanism is described in the L4 Reference Manual. L4 enables the creation of tasks that can be inserted on arbitrary IPC paths. A mechanism called IPC redirection is used in the preferred embodiment to determine whether an IPC is sent to a monitor or to a destination ("Flexible Access Control Using IPC Redirection," HotOS 1999). One suitable redirection mechanism is disclosed in copending patent application Ser. No. 09/276,869, filed Mar. 26, 1999, entitled "Flexible Interprocess Communication via Redirection," the disclosure of which is herein incorporated by reference.

Figure 1:
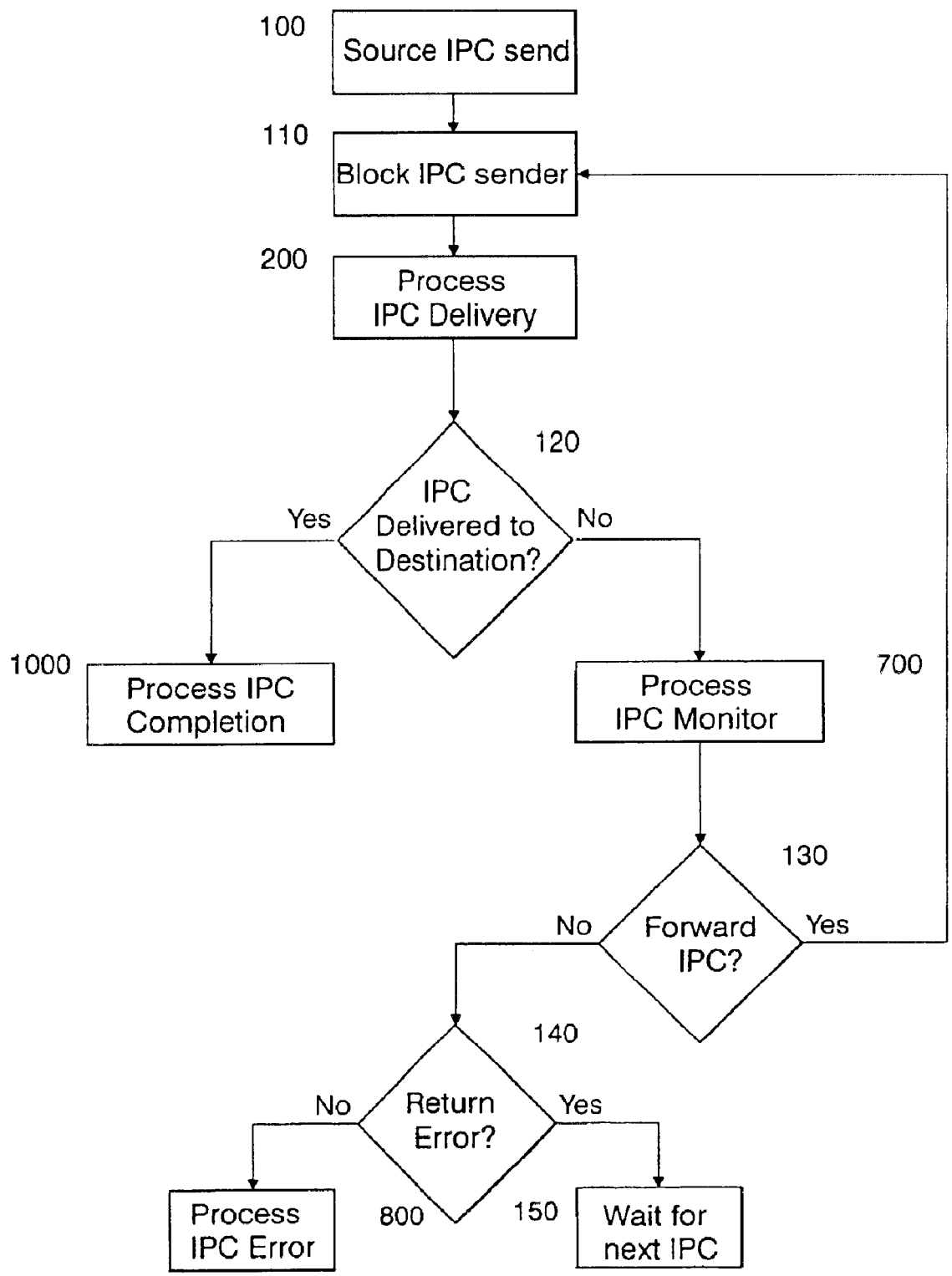
FIG. 1 displays the general mechanism for delivering IPCs synchronously regardless of whether one or more monitors are inserted on the IPC path between the source and destination.

FIG. 1 shows the basic synchronous IPC mechanism that enables transparent use of an arbitrary number of monitors. First, the source requests an IPC send (100). The sender (in this case, the source) is then blocked (110). The kernel processes the IPC delivery (200) which results in the IPC being sent either to the destination or a monitor (120). The kernel uses the IPC redirection mechanism to determine whether the IPC is delivered to the destination or a monitor. If the IPC is delivered to the final destination, then the kernel completes the synchronous IPC Processing to ensure that the source can be unblocked (1000). If the IPC is delivered to a monitor, then the monitor performs its processing and maintains the synchrony information of the IPC (700). The monitor then decides whether to forward the IPC to the destination (or an alternative destination) or not (130). If the IPC is forwarded, the monitor sends the IPC using the mechanisms described in (200). Otherwise, the monitor decides whether to return an error (140). Error messages are a new type of IPC, so a new mechanism is described for handling them (800). If no error is returned, the monitor simply waits for a subsequent request (150).

Figure 2:
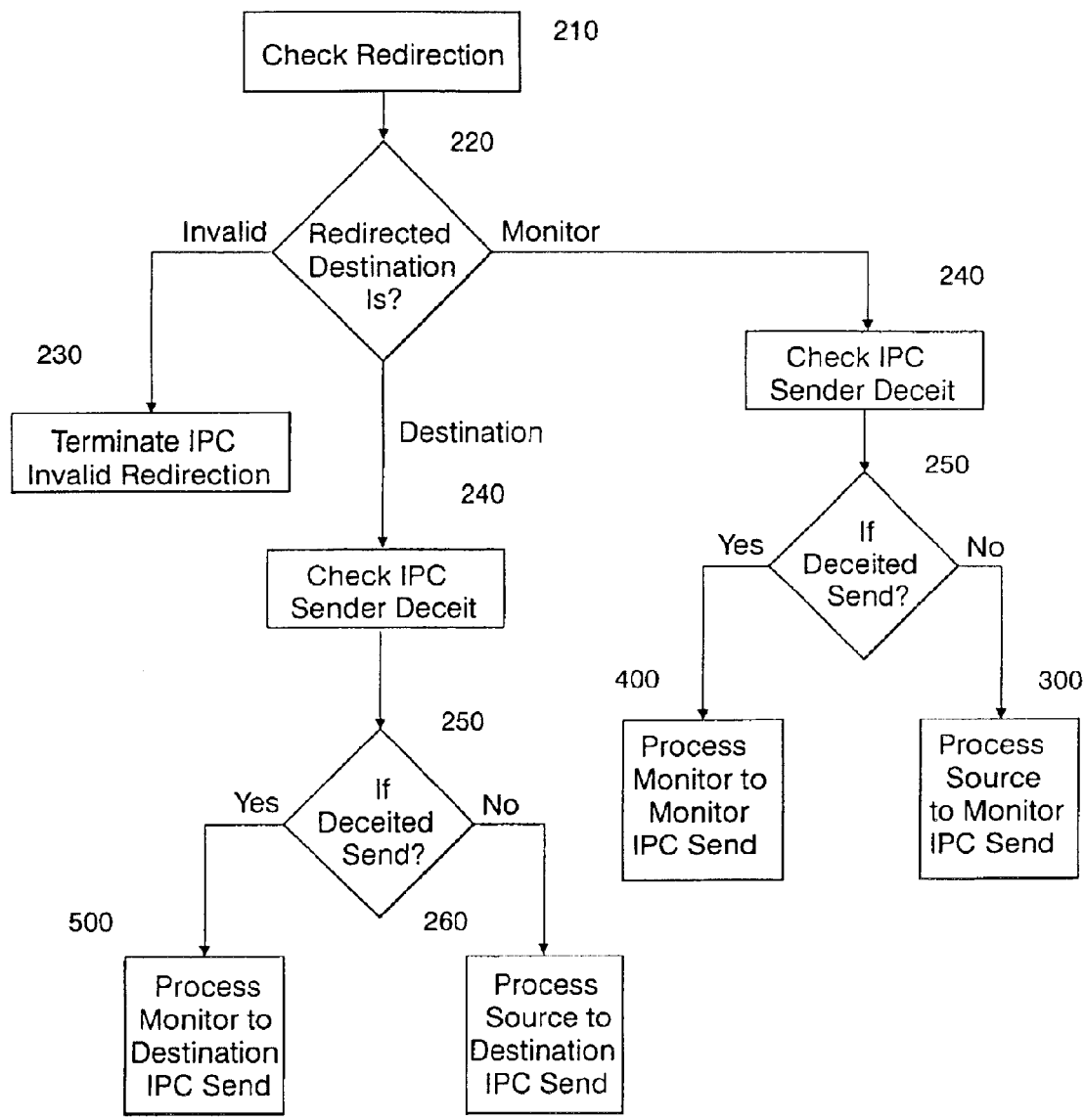
FIG. 2 displays how the delivery mechanism for IPCs is chosen.

FIG. 2 describes how the IPC delivery mechanism is chosen (200). This mechanism is executed by the kernel in the preferred embodiment. First, the IPC redirection mechanism determines the immediate destination of an IPC (210) (220): (1) an invalid destination indicates that the IPC is to be blocked (230); (2) the IPC may be sent directly to a destination; or (3) the IPC may be redirected to a monitor. In addition to the L4 IPC redirection mechanism, monitor tasks must be signified to the kernel, so completion processing can proceed (1000). In either case, the IPC may be deceited (i.e., sent from a task claiming to be another (240), and the delivery mechanism choice depends on whether a monitor or the source directly sent the IPC (250). Different mechanisms are applied for: (1) source to destination delivery (260) (this is the standard L4 IPC delivery mechanism, so it is not covered); (2) source to monitor delivery (300); monitor to monitor delivery (400); or monitor to destination delivery (500).

Figure 3:
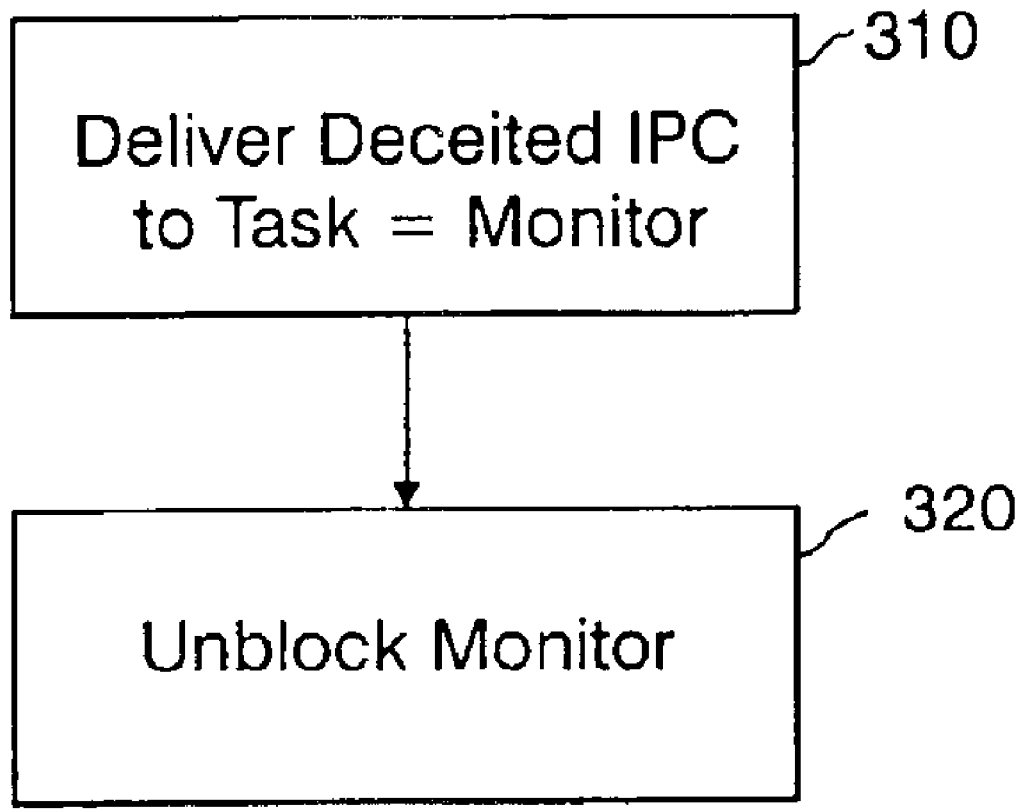
FIG. 3 displays how the kernel implements a source to monitor IPC delivery.

FIG. 3 describes how the kernel processes an IPC delivery from a source to a monitor (300). The kernel simply delivers the IPC from the source to the monitor (310) and unblocks the monitor (320). This delivery (310) is performed using the traditional deceiting IPC as described in the L4 Users' Manual. After the IPC is delivered, only the monitor is unblocked (320). The source remains blocked.

Figure 4:
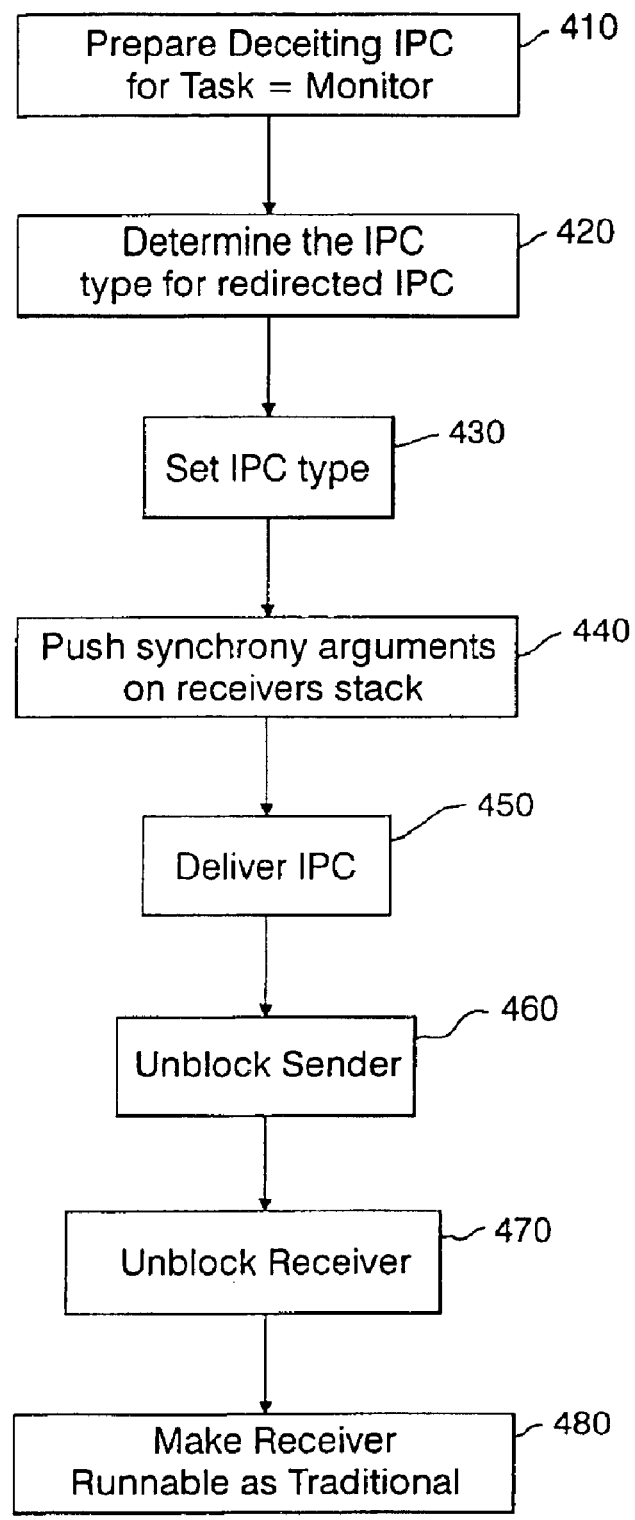
FIG. 4 displays how the kernel implements a monitor to monitor IPC delivery.

FIG. 4 describes how the kernel processes an IPC delivery from a monitor to another monitor (400). First, the kernel sets the traditional deceiting IPC data for the IPC as described in the L4 Users' Manual (410). Then, the kernel determines the type of the IPC (420) and sets the IPC type value appropriately (430). The various IPC type values are listed below:

| IPC type values | |
|---|---|
| direct IPC: | 0 |
| error: | 1 |
| notification: | 2 |
| unblocking: | 3 |
| deceit: | 4 |
| deceit w/ blocked source: | 5 |
| deceit w/ controlling monitor: | 6 |
| Both 5 and 6: | 7 |

The kernel then pushes any synchrony values onto the stack of the IPC receiver (440). If the IPC type is 5, then only the blocked source is pushed. If the IPC type is either 6 or 7, then both the blocked source and controlling monitor values are pushed. If the IPC type is 0–4 no parameters are pushed. The kernel then delivers the IPC using the traditional L4 mechanism (450). Both the sender and receiver of the IPC are unblocked (460) (470) although according to L4 IPC semantics, the receiver is given the remainder of the sender's timeslice, so it become the next runnable task (480).

Figure 5:
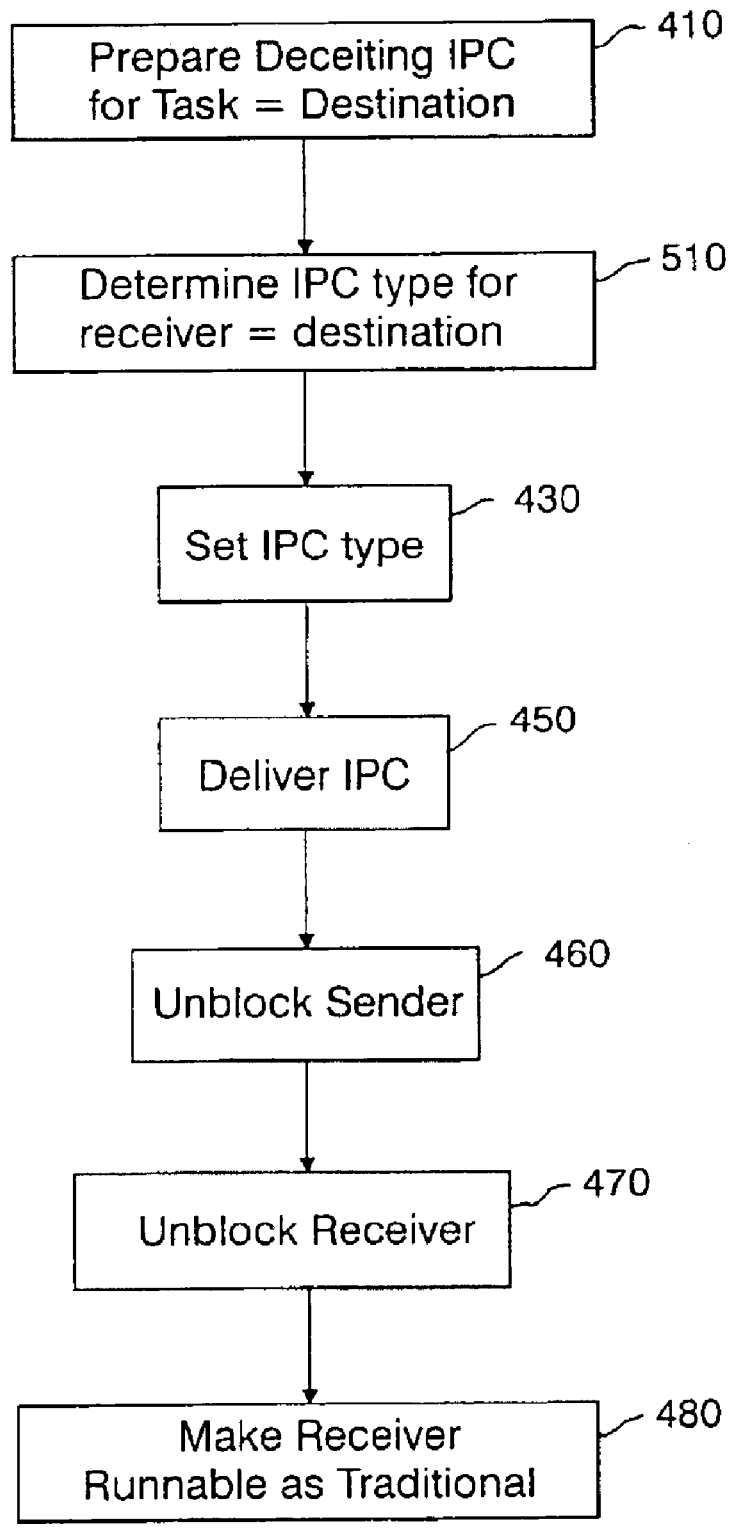
FIG. 5 displays how the kernel implements a monitor to destination IPC delivery.

FIG. 5 describes how the kernel sends an IPC to the destination (500). Basically, the mechanism is the same except that there is no need for the synchrony information to be passed to the destination. Therefore, IPC types 5–7 are equivalent to 4 in this case. First, the IPC is prepared for a deceited send as before (410). Then, the IPC type given that the IPC is to be delivered to the destination is determined (510). Then, the IPC type is set (430). Next, the IPC is delivered by the kernel as is traditional in L4 (450). Then, the sender and receiver are unblocked (460) (470). Lastly, the destination is made runnable (480).

Figure 6:
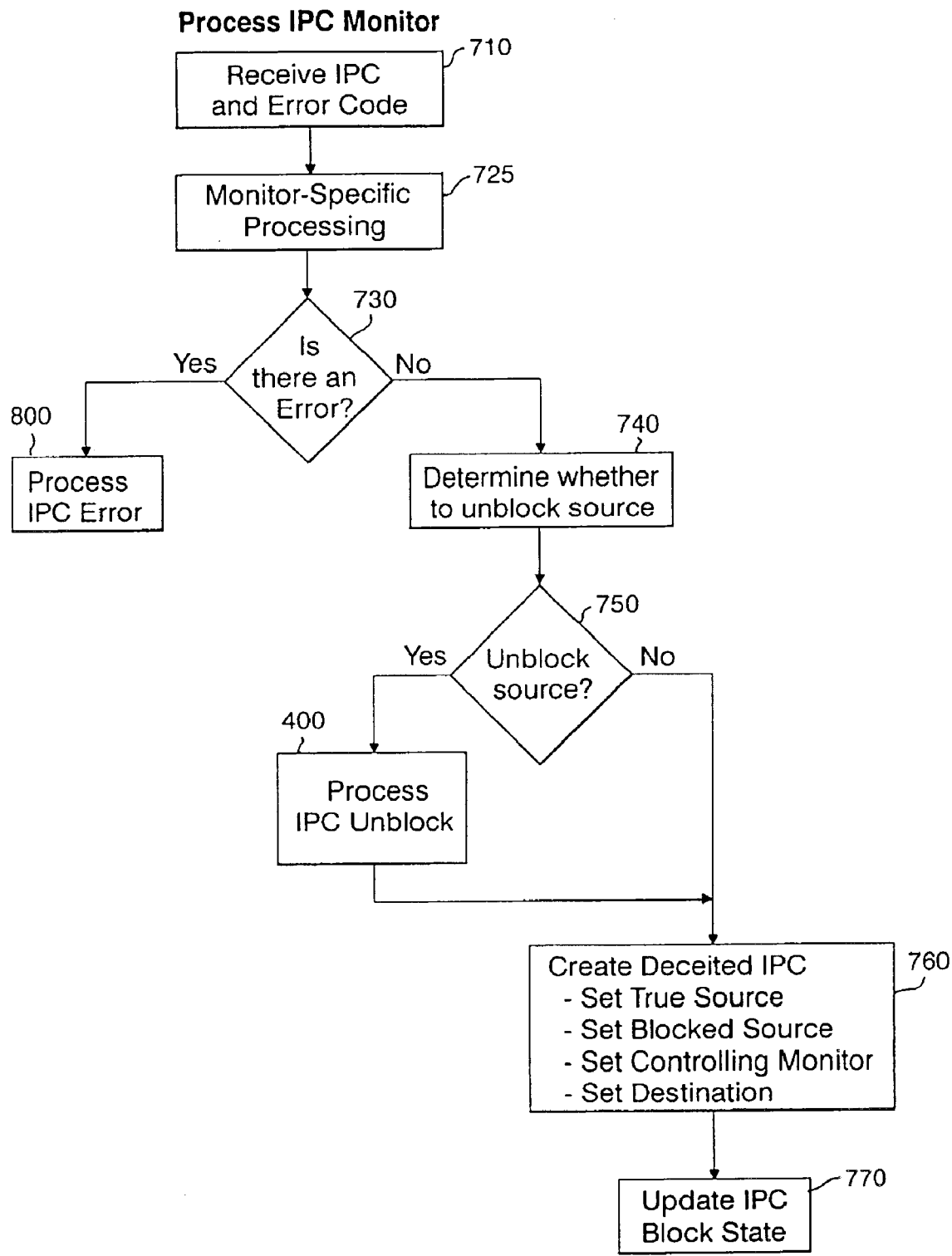
FIG. 6 displays the process by which a monitor handles IPCs that are redirected to it while managing the synchronicity information.

FIG. 6 describes how the monitor processes the IPCs that are redirected to it (700). IPCs that are intended for the monitor are processed as traditional L4 IPCs. First, the monitor receives the IPC message and error codes (710). Using this information, the monitor can do arbitrary, monitor-specific processing (720). If the monitor detects an error (720) (either through the error codes or its monitor-specific processing), the monitor then processes the IPC error (800). If there is no error, then the monitor determines whether to unblock the source (740). If the source is to be unblocked (750), the monitor must process a source unblock (900). Regardless, the monitor creates a deceiting IPC message typical to L4 except that the monitor can now also specify the blocked source and/or the controlling monitor (760). Lastly, the monitor determines whether to update the IPC block state of the original source (770).

Figure 7:
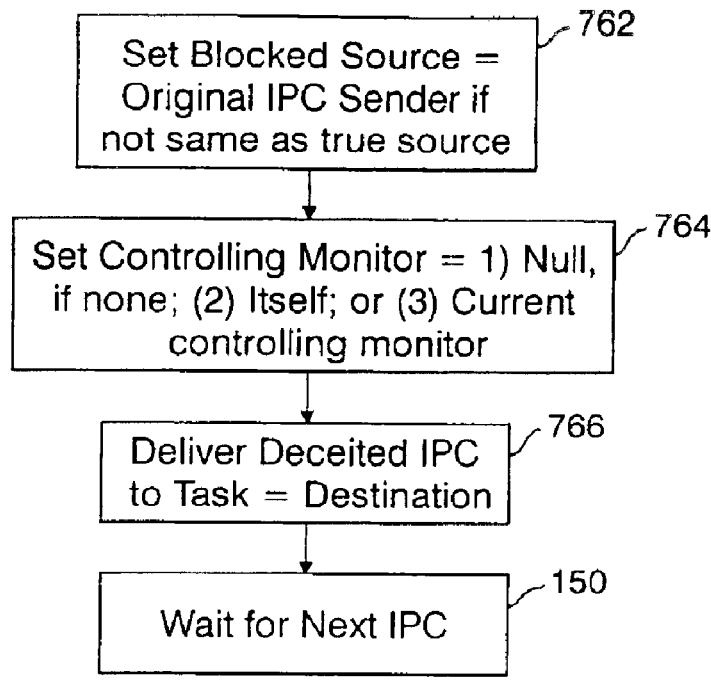
FIG. 7 displays how the monitor prepares an IPC that it is forwarding.

FIG. 7 describes how the monitors prepare IPCs that they are going to forward. First, the monitor sets the blocked source (762) and controlling monitor (764) values for the IPC as necessary. The blocked source need only be set (762) if the identity of the original source of the IPC Is different than the true source specified in the deceited IPC. The monitor may set the value of the controlling monitor to (764): (1) null, if none is specified; (2) itself if it wants to receive notification when the IPC has been completed (i.e., been delivered to the destination); or (3) the current controlling monitor value it received in the incoming IPC. Subsequently, the monitor completes and delivers a typical L4 deceited IPC (766) and then waits for further redirected IPCs (150).

Figure 8:
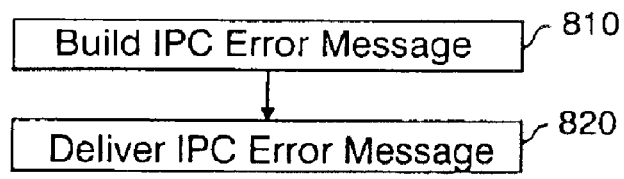
FIG. 8 displays how an IPC error message is processed.

FIG. 8 describes how an IPC error message is processed (800). First, the monitor builds an IPC error message (810). Second, the monitor asks the kernel to deliver the IPC error message using the basic L4 IPC mechanism (820). The IPC error message is itself an IPC, so it can be delivered using a slight generalization of the basic IPC mechanism. Then, the monitor waits for the next IPC (150).

Figure 9:
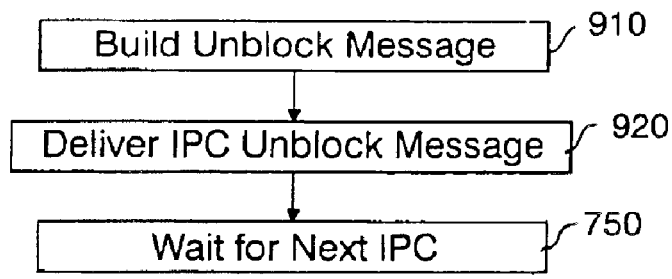
FIG. 9 displays how an IPC unblock message is processed.

FIG. 9 describes how an IPC unblock message is processed (900). First, the monitor builds an IPC unblock message (910). Next, the monitor asks the kernel to deliver the IPC unblock message (920). Like the IPC error message case, the IPC unblock message is also an IPC. Lastly, the monitor waits for the next IPC (150).

Figure 10:
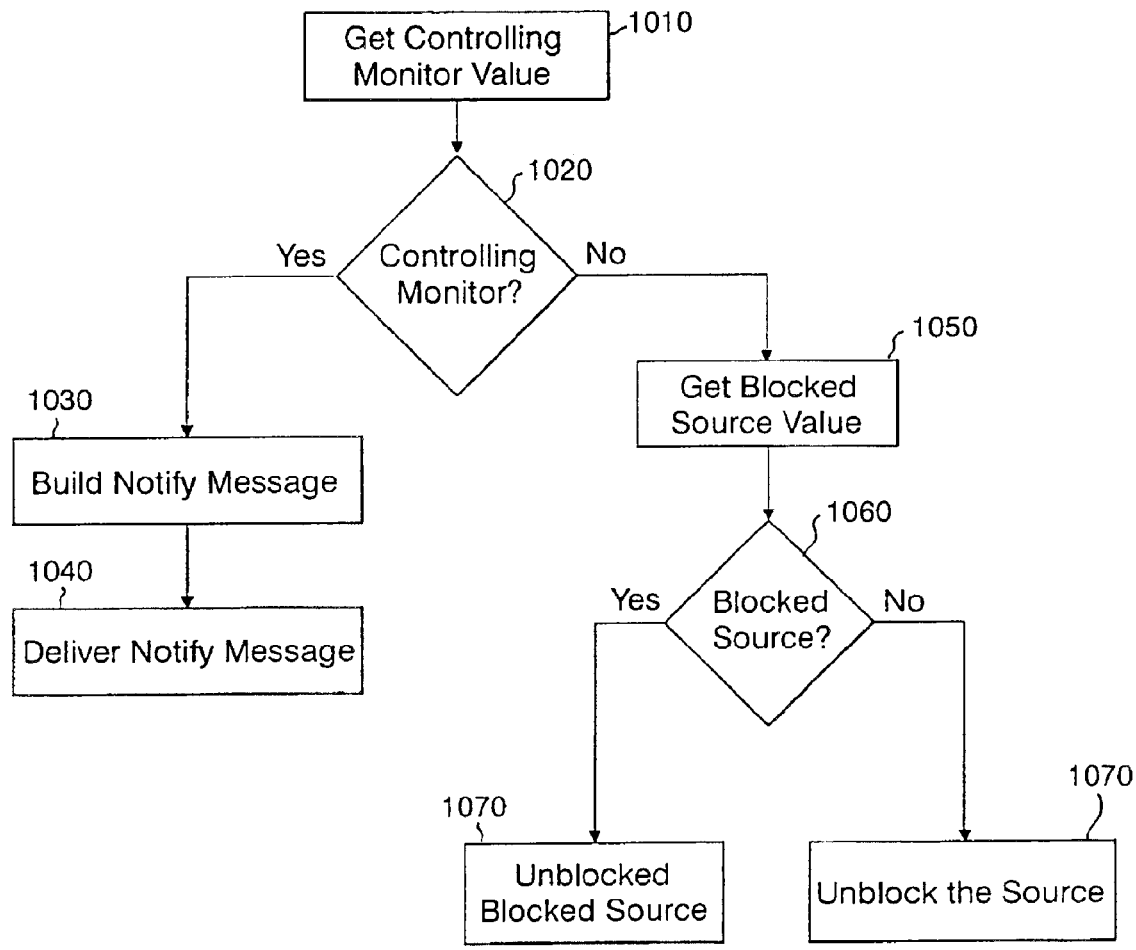
FIG. 10 displays how the synchrony is implemented when the IPC is delivered to the destination.

FIG. 10 describes the additional IPC effort when the IPC is delivered to the destination from the monitor (1000). At this time, the kernel must determine how to proceed with unblocking the source. If a controlling monitor is set (1010) (1020), then a notify message is constructed which is used to inform the controlling monitor that IPC from the source has been completed (1030). This message is delivered to the controlling monitor (1040). If no controlling monitor is set, the kernel then determines whether a blocked source is set (1050) (1060). If so, the blocked source task is unblocked (1070). Otherwise, the value of the true source is unblocked (1070).

Figure 11:
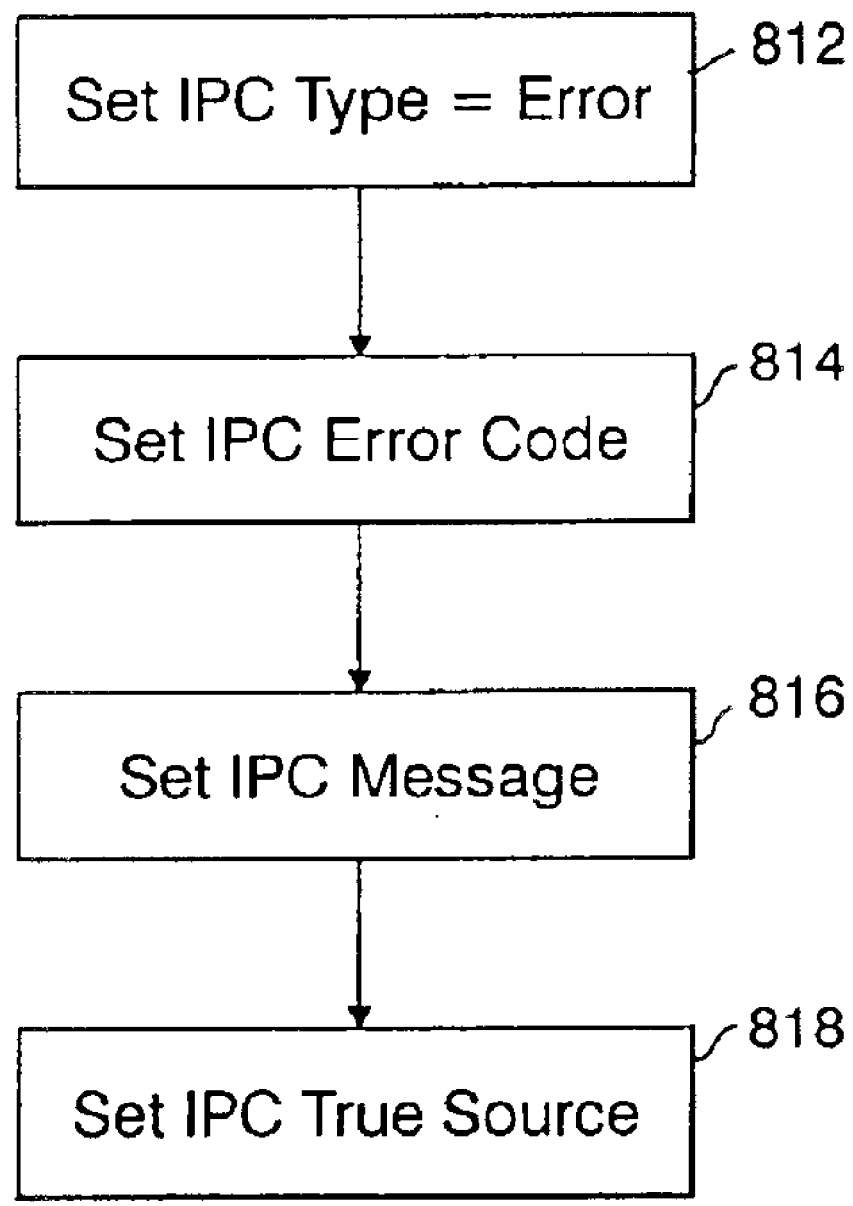
FIG. 11 displays how an IPC error message is built.

FIG. 11 describes the mechanism for building error messages (810). The key component is the setting of the IPC error type (812). Following this, the error code of the IPC is set (814). Any IPC message for the source is added (816). Lastly, the blocked source of the IPC is set, so the IPC error is delivered to the proper task (818).

Figure 12:
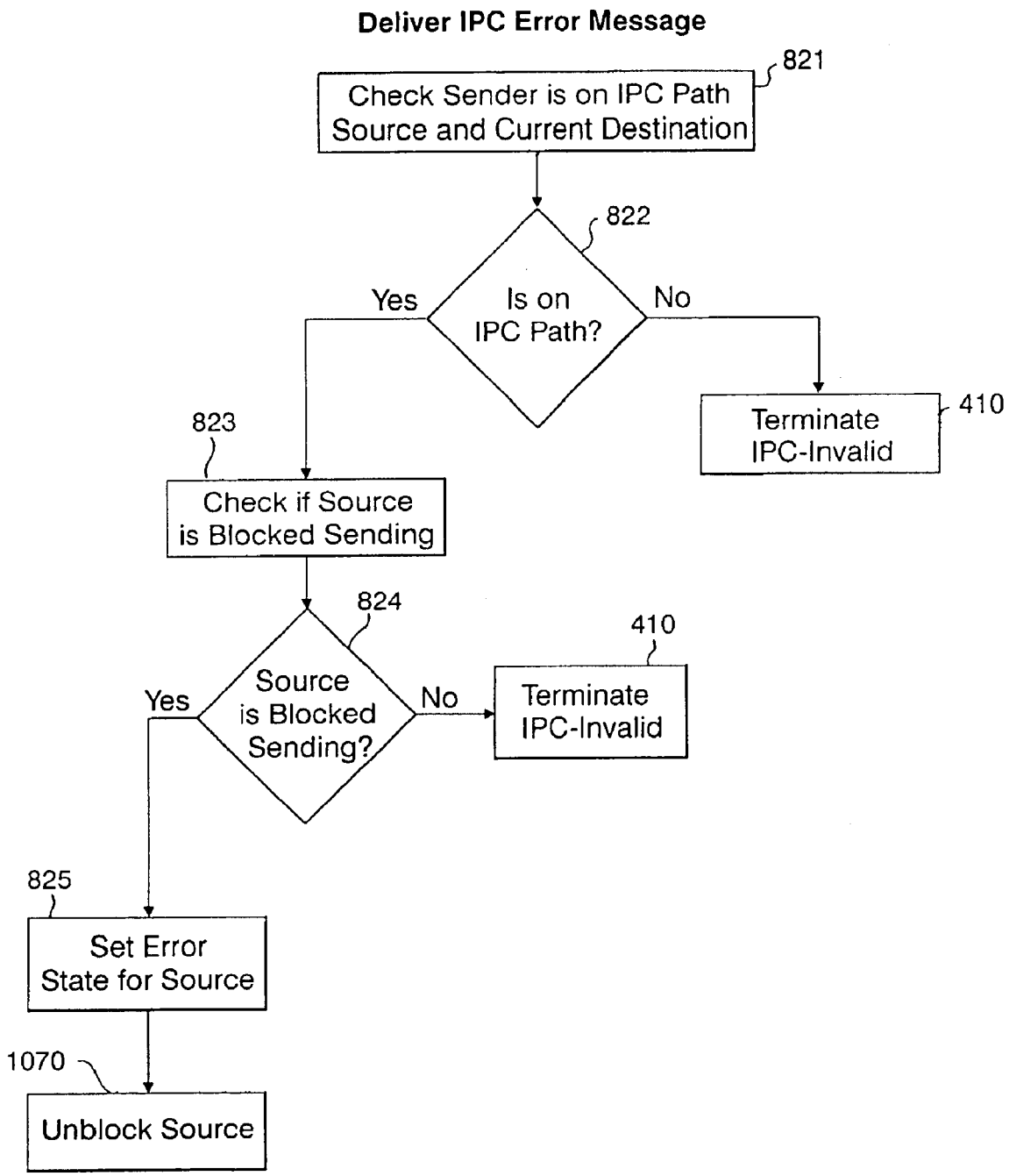
FIG. 12 displays how an IPC error message is delivered.

FIG. 12 describes how IPC error messages are delivered by the kernel (820). The kernel first determines if the monitor is on the IPC path source and destination (821). If so (822), the kernel determines if the source is blocked on the destination (823). If the source is blocked on the destination (824), then the kernel sets the IPC error state for the source (825) and unblocks the source (826). If the monitor is not on the proper IPC path (822) or the source is not blocked on the destination (824), the IPC error message is terminated and an error is returned to the monitor (410).

Figure 13:
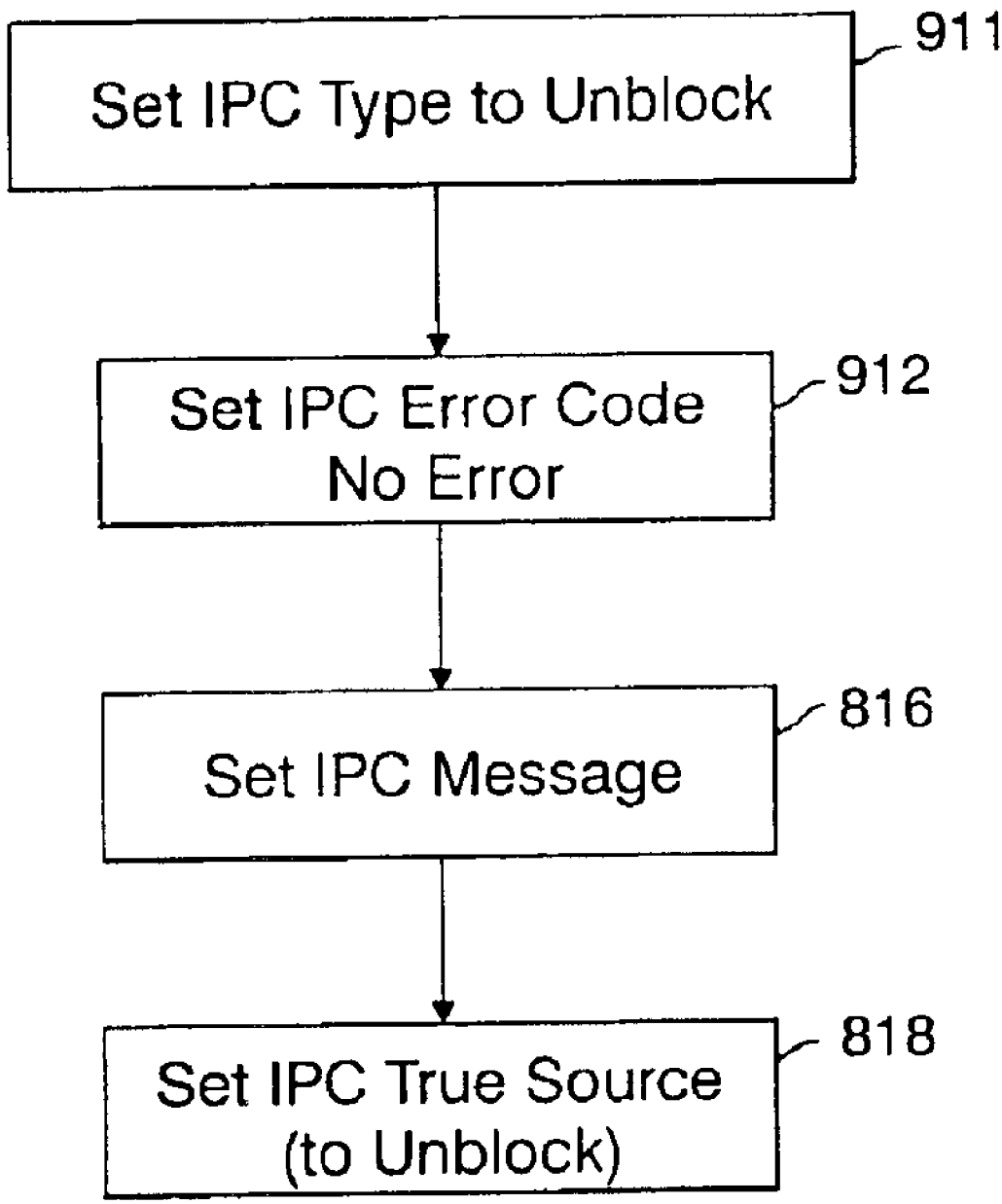
FIG. 13 displays how an IPC unblock message is built.

FIG. 13 describes the mechanism for building unblock messages (910). The key step is the setting of the IPC unblock type (911). Following this, the error code of the IPC is set (912). Any IPC message for the source is added (816). Lastly, the blocked source of the IPC is set, so the IPC unblock is delivered to the proper task (818).

Figure 14:
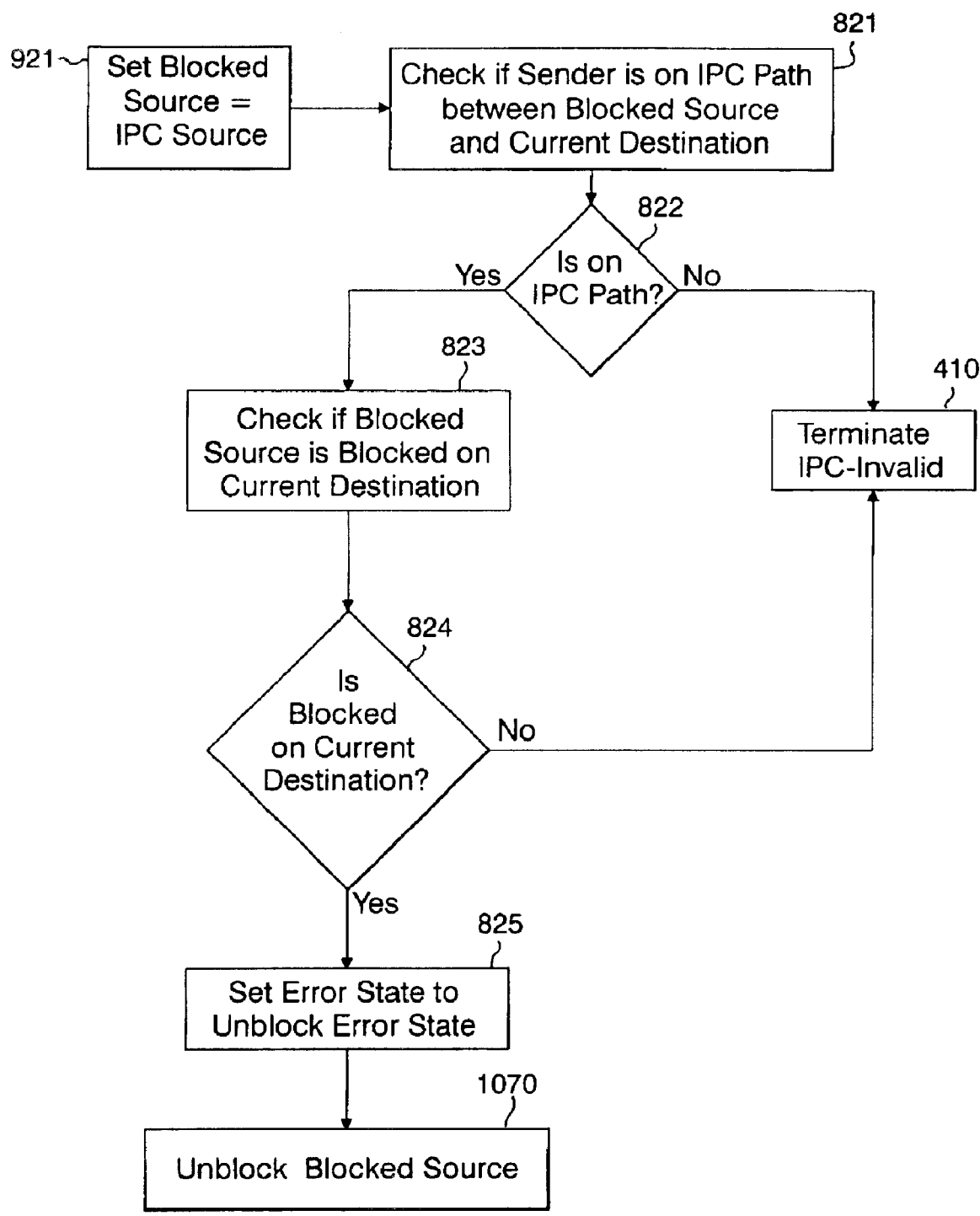
FIG. 14 displays how an IPC unblock message is delivered.

FIG. 14 describes how IPC unblock messages are delivered by the kernel (920). The kernel first sets the blocked source identity to that of the source in the IPC (921). Next, the kernel determines if the monitor is on the IPC path between the blocked source and the current destination (821). If so (822), the kernel determines if the source is blocked on the destination (823). If the source is blocked on the destination (824), then the kernel sets the IPC error state for the source to that specified in the unblock IPC (825) and unblocks the blocked source (1070). If the monitor is not on the proper IPC path (822) or the sender is not blocked on the destination (824), the IPC error message is terminated and an error is returned to the monitor (410).

Figure 15:
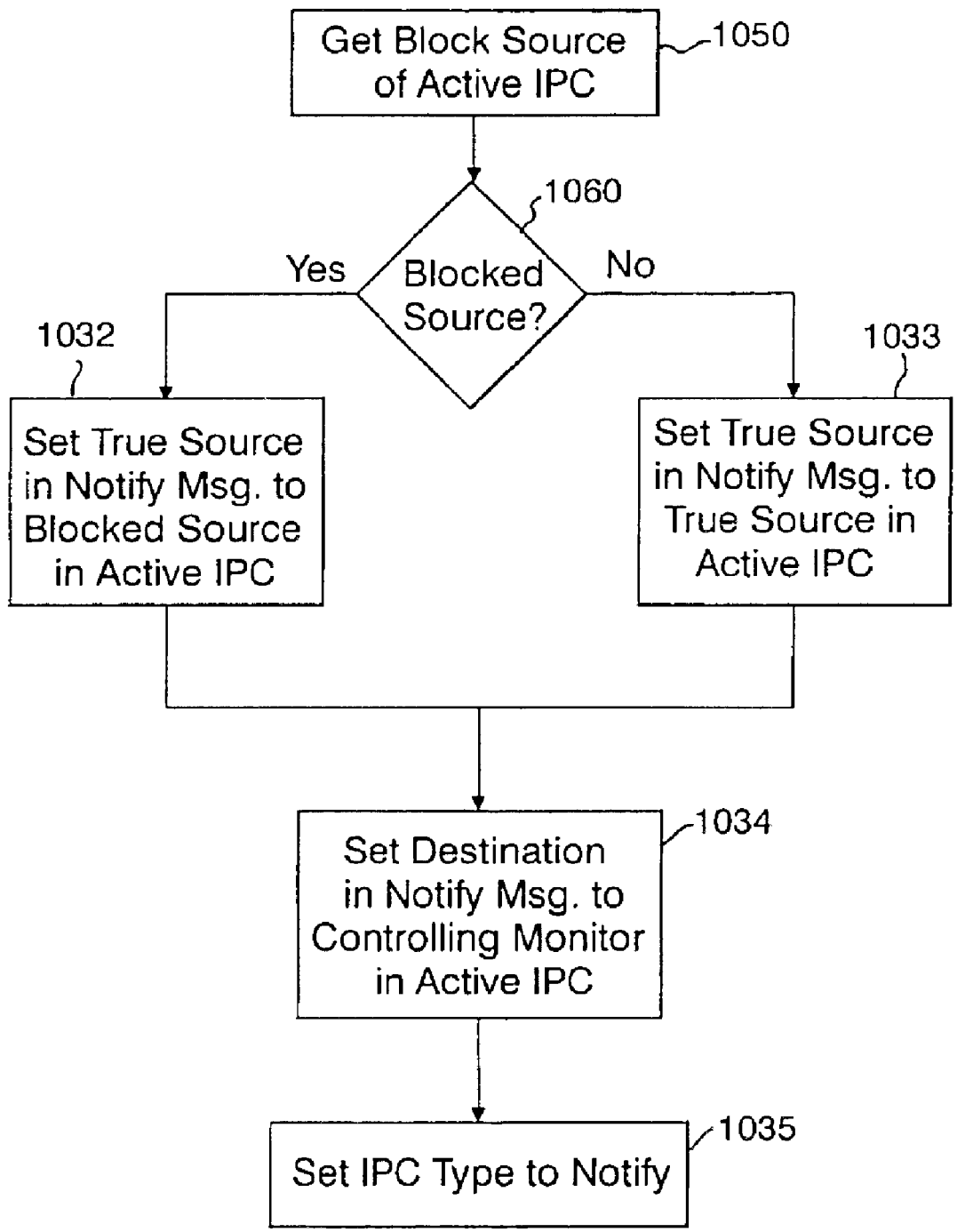
FIG. 15 displays how an IPC notify message is built.

FIG. 15 describes how a IPC notify message is built that informs a controlling monitor of a completed IPC. First, the kernel obtains the blocked source of the active IPC (1050). If there is a blocked source (1060), the kernel sets the true source of the notify IPC to the blocked source (1032). If there is no blocked source (1060), then the true source of the notify IPC is set to the true source of the active IPC (1033). The kernel sets the destination in the notify IPC to the controlling monitor in the active IPC (1034). Lastly, the kernel sets the IPC type to notify (1035).

Figure 16:
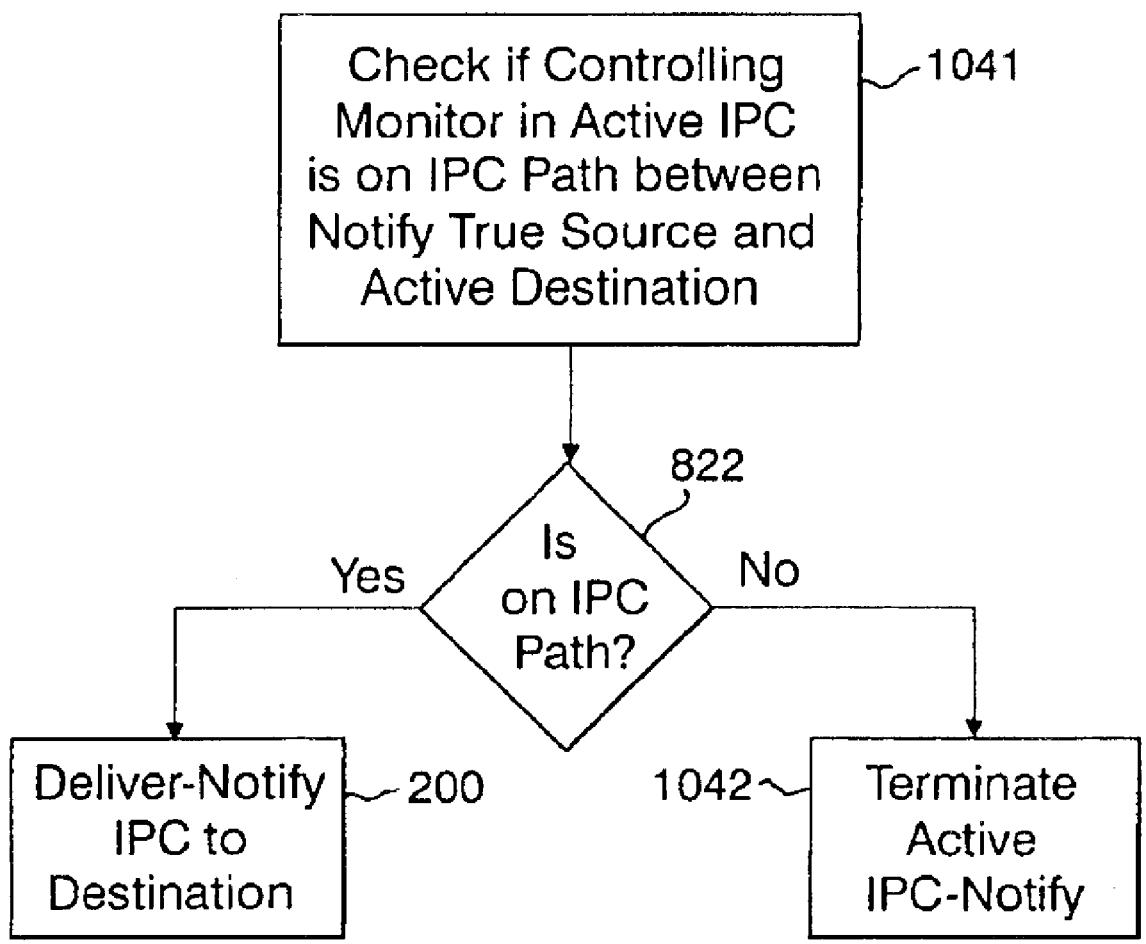
FIG. 16 displays how an IPC notify message is delivered.

FIG. 16 describes how the kernel delivers a notify IPC. The kernel first verifies that the controlling monitor of the active IPC is on the IPC path between the notify IPC's true source and the active IPC's destination (1041). If it is on the IPC path (822), then the kernel delivers the notify IPC as a typical IPC (200). Otherwise, the monitor receives a notify error from the kernel in its error state (1042).

Figure 17:
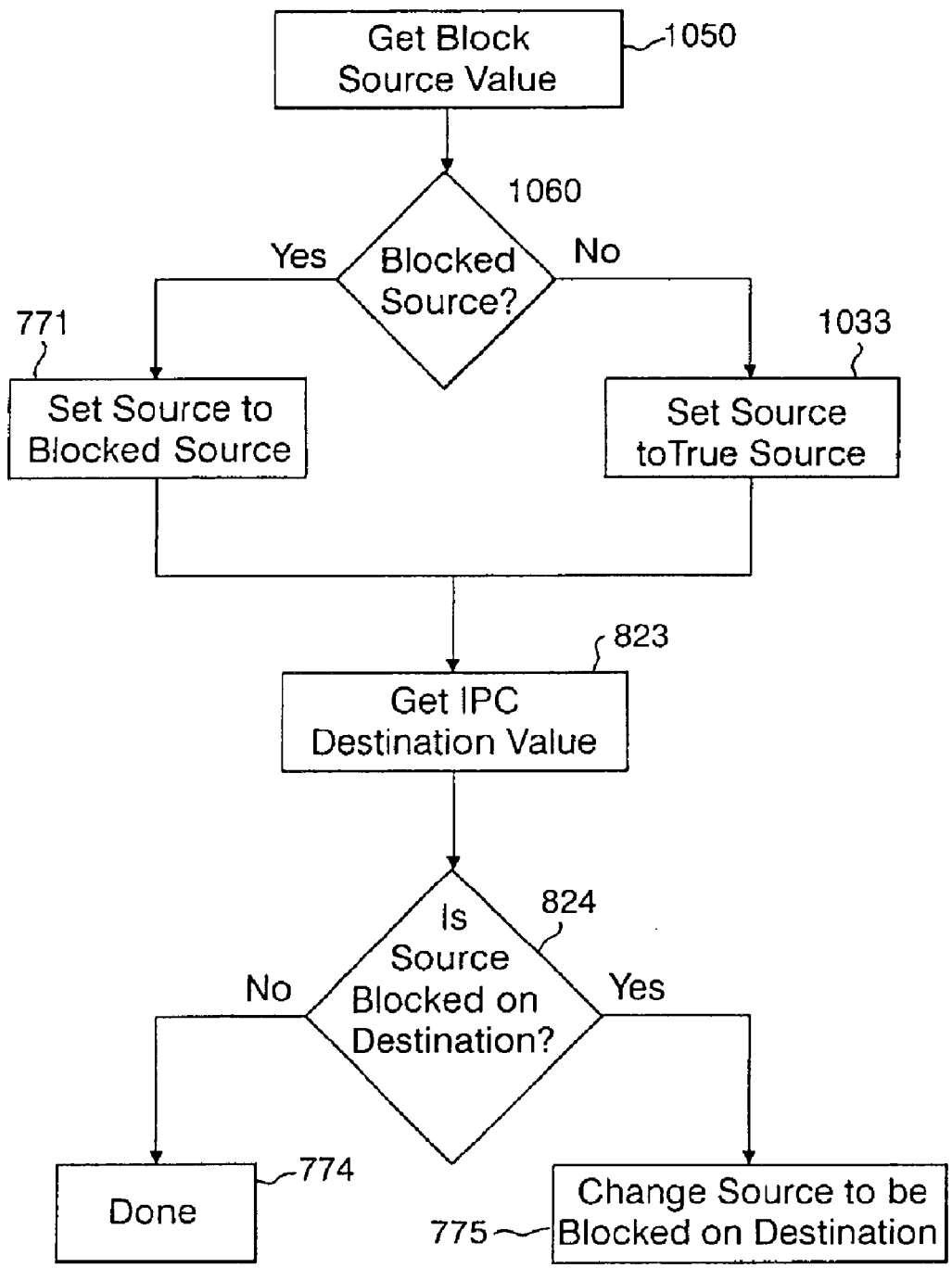
FIG. 17 displays how the destination to which a source is blocked is changed should a monitor redirect the message to an alternative final destination.

FIG. 17 describes how the kernel updates the blocked source's destination when the monitor specifies a change in destination (770). First, the kernel gets the blocked source value (1050). If there is a blocked source (1060), then the source of the changed destination is then set to the blocked source (771). Otherwise, the source of the changed destination is set to the true source (772) Next, the new destination is retrieved (823). If the source is blocked (824), then the destination in which it is blocked is changed to the new destination (775). Otherwise, no action is taken (774).

While it is apparent that the invention herein disclosed is well calculated to fulfill the objects stated above, it will be appreciated that numerous modification and embodiments may be devised by those skilled in the art, and it is intended that the appended claims cover all such modifications and embodiments as fall within the true spirit and scope of the present invention.

What is claimed is:

1. A method for controlling the synchrony of interprocess communication (IPC) which uses:

a. the original sender of the communication, called the source;
   b. the ultimate receiver of the communication, called the destination;
   c. a kernel process that is capable of delivering communications and unblocking the source of the communication;
   d. one or more processes, called monitors, to which the kernel process may choose to deliver a communication to, rather than the destination, and which have the ability to request control of when a source is unblocked, called the controlling monitor of the source, wherein the method for controlling the synchrony of interprocess communication comprise the following steps:

when the communication is sent by the source, the source is blocked by the kernel process;
   the kernel either delivers the communication to the destination or to a monitor;
   the monitor may request that the kernel process make it the controlling monitor of the source;
   the monitor forwards the communication to the destination specifying the source of the communication, and the monitor is blocked by the kernel process until the communication is delivered either to the destination or another monitor;
   when the communication is delivered to the destination, the kernel process either: (1) signals the controlling monitor of the specified source, if any, or (2) unblocks the specified source;
   the controlling monitor of the source can request that the kernel process unblock the source at any time after being signalled that the communication was delivered to the destination;
   whereby the interprocess communication appears to the destination and to the source to have the same semantics regardless of whether the communication is sent directly from the source to the destination without being examined by the monitor, or the communication is sent from the source to the destination via the monitor and the monitor examines the communication.

2. A method as claimed in claim 1, wherein the monitor may change the identity of the source that is seen by the destination while maintaining the identity of the original source for unblocking purposes.

3. A method as claimed in claim 1, wherein the monitor may change the identity of the destination to which the communication is to be delivered.

4. A method as claimed in claim 1, wherein the communication embodies a message, and said message is not delivered to the monitor.

5. A method as claimed in claim 1, wherein the timeouts on the communication are interpreted as being relative to the behaviors of the source and destination.

6. A method as claimed in claim 5, wherein the kernel process does not deliver the communication to the destination or a monitor until the destination is ready to receive the communication and the destination timeout has not expired, said destination timeout being the timeout set by the source on the amount of time it will wait for the destination to become ready to receive the communications.

7. A method as claimed in claim 5, wherein the kernel process delivers the communication to the monitor as soon as the monitor is ready, and the monitor checks for the destination timeout's expiration.

8. A method as claimed in claim 5, wherein the kernel process verifies the source timeout has not expired before sending the communication to the destination or a monitor, said source timeout being the timeout set by the destination on the amount of time it will wait for the source to initiate the communication.

9. A method as claimed in claim 1, wherein multiple monitor processes may claim to be the controlling monitor of a source.

10. A method as claimed in claim 9, wherein a sequence of controlling monitors for a particular source may be stored in the kernel.

11. A method as claimed in claim 1, wherein the kernel process may authorize a monitor's permission to be the controlling monitor of a particular source.

12. A method as claimed in claim 11, wherein the kernel process may authorize a monitor's permission to be the controlling monitor of any source.

13. A method as claimed in claim 1, wherein the controlling monitor for a particular source may be stored in the kernel.

14. A method as claimed in claim 1, wherein the identity of the controlling monitor of a particular source is passed in the IPC to the destination.

15. A method as claimed in claim 14, wherein the sequence of controlling monitors for a particular source is stored by the controlling monitor storing its controlling monitor predecessor for each source.

16. A method as claimed in claim 1, wherein the controlling monitor for a source is implemented by changing the original source to the controlling monitor and the controlling monitor stores the identity of the original source.

17. A method as claimed in claim 16, wherein a sequence of controlling monitors for a particular source is implemented as a sequence of original source changes in the monitors where the last in the sequence is the original source.

18. A method as claimed in claim 1, wherein the monitors are implemented as threads.

19. A method as claimed in claim 1, wherein the monitors are implemented as procedures.

20. A method as claimed in claim 1, wherein the monitor procedures are in the kernel process.

21. A method of performing interprocess communications (IPCs), comprising the steps of:

an IPC process receiving IPC requests, each of the IPC requests including a source identifier identifying a source and a destination identifier identifying a destination;
   building IPCs in response to the requests;
   transmitting the IPCs from the sources to the destinations;
   intercepting and examining selected ones of the IPCs; and
   controlling the synchrony of the IPCs so that each IPC appears to the source and to the destination to have the same semantics regardless of whether the IPC is sent directly from the source to the destination without being intercepted and examined by a monitor, or the communication is sent from the source to the destination via the monitor and the monitor examines the communication.

22. A method according to claim 21, wherein:

the step of building and transmitting IPCs includes the step of using a kernel to build and transmit the IPCs;
   the step of intercepting and examining selected ones of the IPCs includes the step of using monitors to intercept and examine the selected ones of the IPCs; and the controlling step includes the step of using the monitors as extensions of the kernel so that the IPCs appear to the sources and to the destinations to be implemented according to the same semantics regardless of whether a monitor is used or not used to intercept and examine the IPCs.

23. A method according to claim 22, wherein, for each IPC, one or more of the monitors manages the identity of the source for the IPC.

24. A method according to claim 22, further comprising the step of, for each IPC, blocking the source for the IPC at selected times, and wherein one or more of the monitors determines when the source is unblocked.

25. A method according to claim 22, wherein, for each IPC, one of the monitors manages whether the monitor is notified when the IPC reaches the destination for the IPC.

26. An interprocess communications (IPCs) system, comprising:
    a processor having an IPC process for receiving IPC requests, each of the IPC requests including a source identifier identifying a source for the IPC and a destination identifier identifying a destination for the IPC;
    means for building IPCs in response to the requests;
    means for transmitting the IPCs from the sources to the destinations;
    means for intercepting and examining selected ones of the IPCs; and
    a controller for controlling the synchrony of the IPCs so that each IPC appears to the source and to the destination for the IPC to have the same semantics regardless of whether the IPC is sent directly from the source to the destination without being intercepted and examined by the monitor, or the communication is sent from a source to the destination via the monitor and the monitor examines the communication.

27. A system according to claim 26, wherein:
    the means for building and transmitting IPCs includes a kernel to build and transmit the IPCs;
    the means for intercepting and examining selected ones of the IPCs include monitors to intercept and examine the selected ones of the IPCs; and
    the monitors are used as extensions of the kernel so that the IPCs appear to the sources and to the destinations to be implemented according to the same semantics regardless of whether a monitor is used or not used to intercept and examine the IPCs.

28. A system according to claim 26, wherein, for each IPC, one or more of the monitors manages determines the identity of the source for the IPC.

29. A system according to claim 26, wherein, for each IPC, the source for the IPC is blocked at selected times, and one or more of the monitors determines when the source is unblocked.

30. A system according to claim 26, wherein, for each IPC, one of the monitors manages whether the monitor is notified when the IPC reaches the destination for the IPC.

31. A program storage device readable by machine, tangibly embodying a program of instructions executable by the machine to perform method steps for performing interprocess communications (IPCs), said method steps comprising:
    an IPC process receiving IPC requests, each of the IPC requests including a source identifier identifying a source and a destination identifier identifying a destination;
    building IPCs in response to the requests;
    transmitting the IPCs from the sources to the destinations;
    intercepting and examining selected ones of the IPCs; and
    controlling the synchrony of the IPCs so that each IPC appears to the source and to the destination to have the same semantics regardless of whether the IPC is sent directly from the source to the destination without being intercepted and examined by a monitor, or the communication is sent from the source to the destination via the monitor and the monitor examines the communication.

32. A program storage device according to claim 31, wherein:
    the step of building and transmitting IPCs includes the step of using a kernel to build and transmit the IPCs;
    the step of intercepting and examining selected ones of the IPCs includes the step of using monitors to intercept and examine the selected ones of the IPCs; and
    the controlling step includes the step of using the monitors as extensions of the kernel so that the IPCs appear to the sources and to the destinations to be implemented according to the same semantics regardless of whether a monitor is used or not used to intercept and examine the IPCs.

33. A program storage device according to claim 32, wherein, for each IPC, one or more of the monitors manages the identity of the source for the IPC.

34. A program storage device according to claim 32, further comprising the step of, for each IPC, blocking the source for the IPC at selected times, and wherein one or more of the monitors determines when the source is unblocked.

35. A program storage device according to claim 32, wherein, for each IPC, one of the monitors manages whether the monitor is notified when the IPC reaches the destination for the IPC.

* * * * *

UNITED STATES PATENT AND TRADEMARK OFFICE
CERTIFICATE OF CORRECTION

PATENT NO. : 6,862,734 B1
DATED : March 1, 2005
INVENTOR(S) : Trent Ray Jaeger et al.

It is certified that error appears in the above-identified patent and that said Letters Patent is hereby corrected as shown below:

Title page,
Item [75], Inventors, "Jonathon Earnshaw Tidswell, Macquarie Centre (AU)" should read -- Jonathon Earnshaw Tidswell, Bronte, (AU) --.

Column 2,
Between lines 64 and 65, insert new paragraph:
-- In the practice of this invention, a message embodied in the communication may not be delivered to the monitor. Also, the sequence of controlling monitors for a particular source may be stored by the controlling monitor storing its controlling monitor predecessor for each source, and a sequence of controlling monitors for a particular source may be implemented as a sequence of original source changes in the monitor where the last is the true original source.
    In addition, in one embodiment of the invention, the kernel process delivers the communication to the monitor as soon as the monitor is ready, and the monitor check for the destination timeout's expiration. Also, in one embodiment, the kernel process verifies the source timeout (i.e., the timeout set by the destination on the amount of time it will wait for the source to initiate the communication) has not expired before sending the communication to the destination or a monitor.
    Further, in the practice of this invention, multiple monitor processes may claim to be the controlling monitor of a source. Also, the kernel process may authorize a monitor's permission to be the controlling monitor of a particular source, and the kernel process may authorize a monitor's permission to be the controlling monitor of any source. --.

Column 8,
Line 54, "controlling the" should read -- controlling a --.
Line 58, "examined by a" should read -- examined by the --.

UNITED STATES PATENT AND TRADEMARK OFFICE
CERTIFICATE OF CORRECTION

PATENT NO. : 6,862,734 B1
DATED : March 1, 2005
INVENTOR(S) : Trent Ray Jaeger et al.

It is certified that error appears in the above-identified patent and that said Letters Patent is hereby corrected as shown below:

Column 9,
Line 32, "examined by the" should read -- examined by a --.

Signed and Sealed this

Sixteenth Day of August, 2005

JON W. DUDAS
*Director of the United States Patent and Trademark Office*